US007293952B2

(12) United States Patent
Park

(10) Patent No.: US 7,293,952 B2
(45) Date of Patent: Nov. 13, 2007

(54) LIFT APPARATUS FOR VEHICLE FOR THE HANDICAPPED

(75) Inventor: Kwan Hum Park, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 450 days.

(21) Appl. No.: 11/028,135

(22) Filed: Dec. 30, 2004

(65) Prior Publication Data

US 2005/0281647 A1 Dec. 22, 2005

(30) Foreign Application Priority Data

May 7, 2004 (KR) ...................... 10-2004-0032275

(51) Int. Cl.
*B60P 1/54* (2006.01)

(52) U.S. Cl. ....................................... 414/542; 414/921

(58) Field of Classification Search ................ 414/462, 414/542, 561, 921, 541, 647; 212/346; 5/81.1 R
See application file for complete search history.

(56) References Cited

U.S. PATENT DOCUMENTS 1,878,605 A * 9/1932 Schmidt et al. ............... 104/99
3,906,737 A * 9/1975 Brown ....................... 405/179
4,125,908 A * 11/1978 Vail et al. ...................... 5/83.1
4,243,147 A * 1/1981 Twitchell et al. ........... 212/284
4,544,321 A * 10/1985 Lanier ........................ 414/542
4,809,372 A * 3/1989 Dickens ........................ 5/83.1
6,711,759 B1 * 3/2004 Kluckhuhn ................ 5/81.1 R
2005/0095087 A1 * 5/2005 Sullivan et al. ............. 414/217

* cited by examiner

*Primary Examiner*—Charles A Fox
(74) *Attorney, Agent, or Firm*—Morgan Lewis & Bockius LLP

(57) ABSTRACT

The lift apparatus includes a forward and rearward moving rail member mounted to a roof panel within a vehicle body to extend rearward from a position of a driver's seat by a predetermined distance. A leftward and rightward moving rail member is mounted to the roof panel to extend sideward from a rear end of the forward and rearward moving rail member by a preselected distance. A lifter is movable along the forward and rearward moving rail member and the leftward and rightward moving rail member and capable of lifting and holding the seat and lowering and releasing the seat. A rotating device is installed at an intersection of the forward and rearward moving rail member and the leftward and rightward moving rail member, for rotating the lifter by a predetermined angle.

10 Claims, 9 Drawing Sheets

LIFT APPARATUS FOR VEHICLE FOR THE HANDICAPPED

CROSS REFERENCE TO RELATED APPLICATION

This application is based on, and claims priority to Korean Patent Application No. 10-2004-0032275, filed on May 7, 2004, the disclosure of which is hereby incorporated by reference.

BACKGROUND

1. Field

The present invention relates to a lift apparatus for a vehicle for the handicapped, in which means for moving a combined wheelchair and driver's seat are mounted to a roof panel of a vehicle body, to overcome the spatial limitation and the structural complexity of conventional floor panel mounting type lift apparatuses.

2. Background

Generally, a vehicle for the handicapped is provided with convenience facilities for allowing a handicapped person using a wheelchair to directly drive the vehicle without the aid of another person. One of the convenience facilities is a combined wheelchair and driver's seat. Due to the fact that the combined wheelchair and driver's seat is used and an appropriate apparatus for helping the handicapped person to get on or off the vehicle while being on the combined wheelchair and driver's seat is installed on the vehicle, the handicapped driver can get on or off as well as drive the vehicle without the aid of another person.

Therefore, it is to be readily understood that an apparatus for moving the combined wheelchair and driver's seat in the vehicle and raising and lowering the combined wheelchair and driver's seat into and from the vehicle, that is, a lift apparatus can afford much convenience to the handicapped person.

Conventional lift apparatus of suffers from a number of drawbacks as described below. First, the lift apparatus must be installed in a limited space between the floor panel and an H-point, thereby being limited spatially. Second, because a height of the seat must be increased to prevent the seat from interfering with a moving rail member when the seat is rotated, the spatial limitation is worsened. Third, due to the fact that the lifter for lifting and lowering the seat comprises a link mechanism, the size and structure of the lift apparatus is increased and is complex.

SUMMARY

The present invention provides a lift apparatus for a vehicle for the handicapped, which addresses the spatial limitation and structural complexity of conventional lift apparatuses for a vehicle for the handicapped.

According to one aspect of the present invention, there is provided a lift apparatus for a vehicle for the handicapped that includes a forward and rearward moving rail member mounted to a roof panel in an inside space of a vehicle body to extend rearward from a position of a driver's seat by a predetermined distance. A leftward and rightward moving rail member is mounted to the roof panel to extend sideward from a rear end of the forward and rearward moving rail member by a preselected distance. A lifter is movable along the forward and rearward moving rail member and the leftward and rightward moving rail member and capable of lifting and holding the seat and lowering and releasing the seat. A rotating device is installed at an intersection of the forward and rearward moving rail member and the leftward and rightward moving rail member, for rotating the lifter by a predetermined angle.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE EMBODIMENTS

Reference will now be made in detail to the preferred embodiment of the present invention with reference to the attached drawings.

Figure 1:
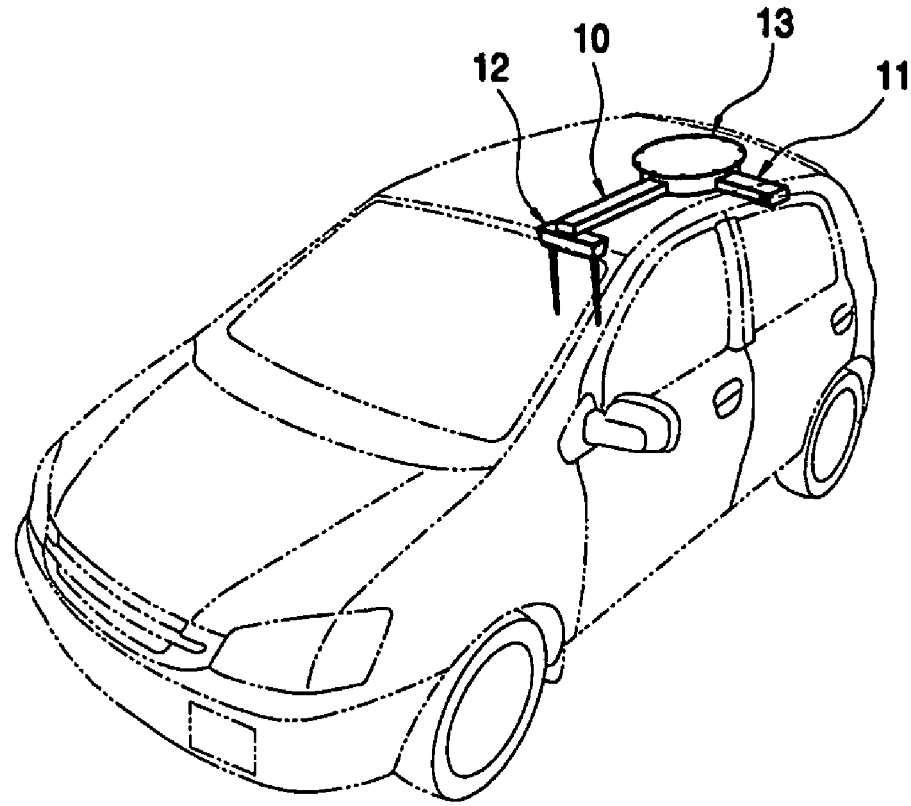
FIG. 1 is a schematic view illustrating a lift apparatus for a vehicle for the handicapped in accordance with an embodiment of the present invention.

FIG. 1 is a schematic view illustrating a lift apparatus for a vehicle for the handicapped in accordance with an embodiment of the present invention. The lift apparatus is composed of a basic moving mechanism which is installed on a roof panel of a vehicle body. The lift apparatus comprises rail members 10 and 11 for moving a combined wheelchair and driver's seat (hereinafter, simply referred to as "seat"), a rotating device 13 for rotating the seat toward a driving position or the outside, and a lifter 12 for lifting and lowering the seat into and out of the vehicle.

The rail members are composed of a forward and rearward moving rail member 10 which extends rearward from the driving position to have a long length, and a leftward and rightward moving rail member 11 which is bent from a rear end of the forward and rearward moving rail member 10 by 90° and extends sideways toward the outside to have a short length. The rotating device 13 for changing a direction of the seat is installed at an intersection of the forward and rearward moving rail member 10 and the leftward and rightward moving rail member 11. Note, that these directions are relative to the normal forward, backward left and right sides of a standard motor vehicle. The rotating device 13 functions to rotate by 90° the lifter 12 moved along the forward and rearward moving rail member 10 when lowering the seat to the ground, toward the leftward and rightward moving rail member 11, and rotate by 90° the lifter 12 moved along the leftward and rightward moving rail member 11 when lifting the seat into the vehicle, toward the forward and rearward moving rail member 10.

The lifter 12 which suspends the seat can be moved along the moving rail members 10 and 11 while being supported in its entirety by the moving rail members 10 and 11. Means for lifting, lowering and moving the seat are disposed in the lifter 12 to perform functions of raising the seat up and lowering the seat down into and out of the vehicle and to be moved while being driven by itself.

Since the moving rail members 10 and 11 and the rotating device 13 must endure loads of the lifter 12, seat, a driver, etc., it is preferred that a separate framework be installed on the roof panel of the vehicle body to reinforce the strength of the roof panel. The moving rail members 10 and 11 and the rotating device 13 may then be mounted to the framework.

Figure 2:
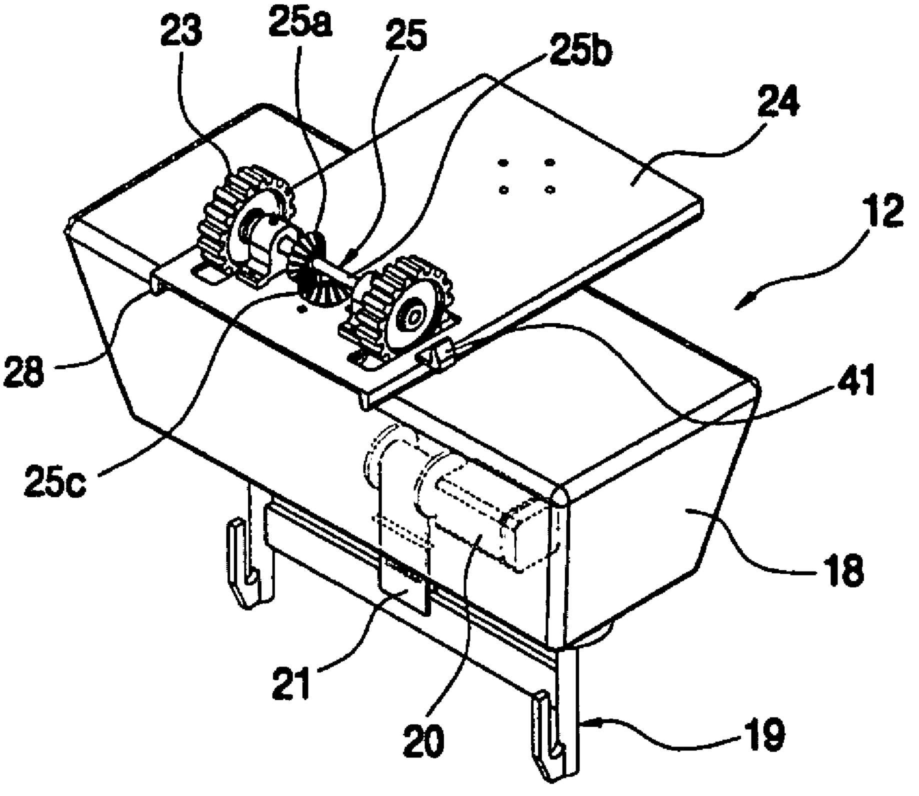
FIG. 2 is a perspective view illustrating a structure of a lifter in the lift apparatus for a vehicle for the handicapped according to the present invention.
Figure 3:
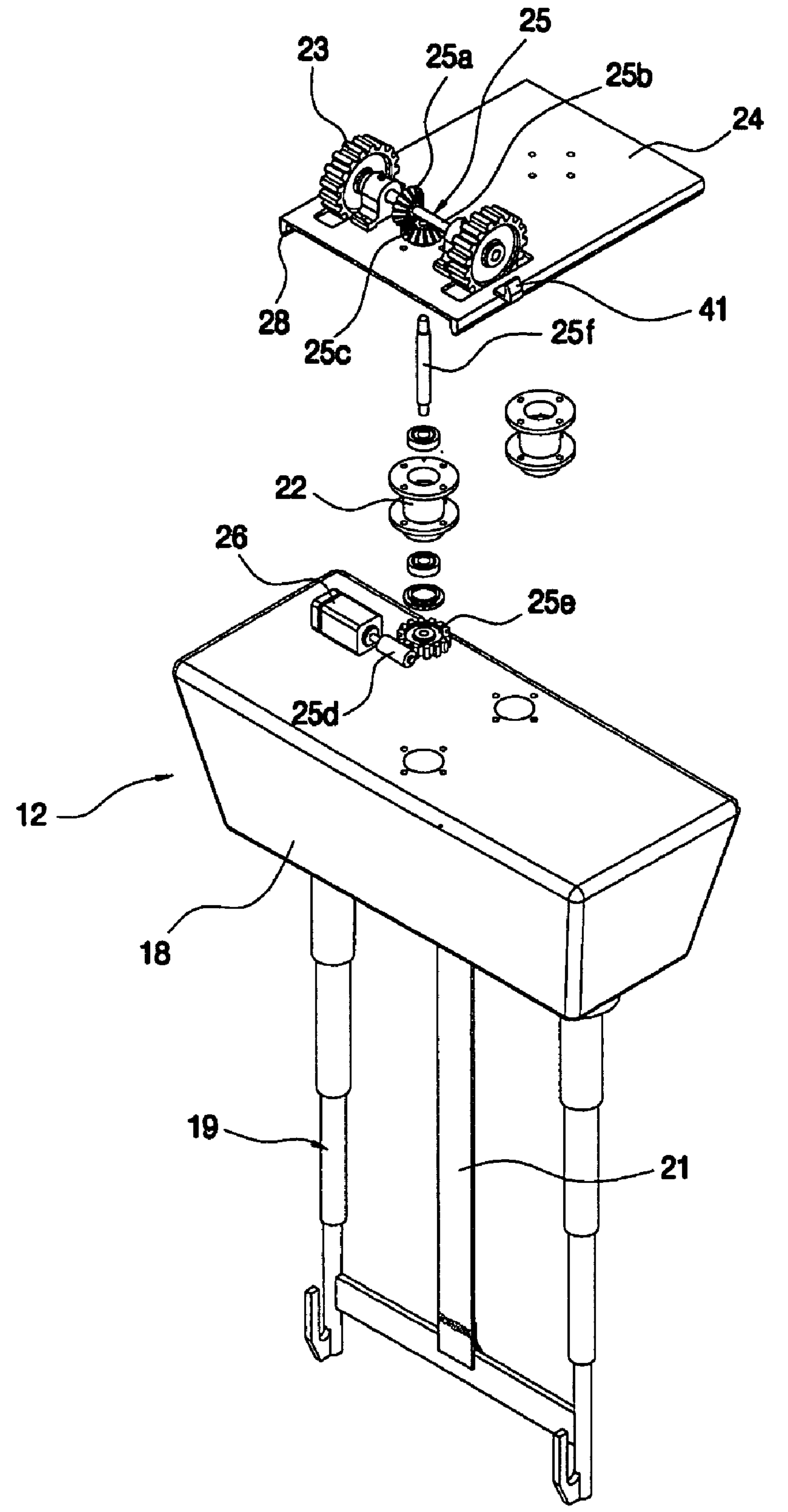
FIG. 3 is an exploded perspective view of FIG. 2.

FIG. 2 is a perspective view illustrating a structure of the lifter 12 in the lift apparatus for a vehicle for the handicapped according to the present invention; and FIG. 3 is an exploded perspective view of FIG. 2. The lifter 12 serves as means for lifting and lowering the seat and moving the seat to the ground and the driving position. The lifter 12 comprises a baseplate 24, a lifter case 18, and a pair of hook elements 19. The baseplate 24 is basically positioned on a bottom wall of each moving rail member 10 and 11 and moved along the moving rail members 10 and 11. The lifter case 18 is suspended and supported by at least a pair of support cylinders 22 which extend downward in a vertical direction from a lower surface of the base plate 24. The pair of hook elements 19 are supported by the lifter case 18 and function to actually raise and lower the seat.

A pair of gear wheels 23 are provided adjacent to both ends, respectively, of the baseplate 24. The pair of gear wheels 23 project partially downward through the baseplate 24 to mesh with toothed rail parts 15 (FIG. 5) of each moving rail member 10 and 11. Therefore, by driving the gear wheels 23, the baseplate 24 can be moved forward, rearward and sideward on the toothed rail parts 15.

The gear wheels 23 are supported by a horizontal driven shaft 25*b* of a power transmitting mechanism 25, which will be described in detail later. Each rail member 10 and 11 has a pair of sliding grooves 27 which is defined on the bottom wall outside the toothed rail parts 15. The baseplate 24 is formed, at both widthwise ends thereof, with sliding projections 28 which extend in a lengthwise direction of the baseplate 24. When the baseplate 24 is moved on each of the moving rail members 10 and 11, as the sliding projections 28 are engaged into the sliding grooves 27 of each rail member 10 and 11, the baseplate 24 can be stably guided without experiencing shaking.

The pair of hook elements 19 for suspending the seat are supported in the vertical direction by a lower surface of the lifter case 18. Adjacent to lower ends of the hook elements 19, a reinforcing element is connected to the hook elements 19 to reinforce strength of the hook elements 19. Each of the hook elements 19 has a shape of a telescope to be capable of being adjusted in its length. Thus, when the hook elements 19 are increased in length, the hook elements 19 can hook both sides of the seat.

A lifting and lowering motor 20 is installed in the lifter case 18 to adjust a length of the hook elements 19. A pulley is mounted to an output shaft of the lifting and lowering motor 20. Both ends of a belt 21 are connected to the pulley and the reinforcing element which is connected to the hook elements 19. As a consequence, if the lifting and lowering motor 20 is driven in one direction, as the belt 21 is unwound from the pulley, the hook elements 19 are lengthened. If the lifting and lowering motor 20 is driven in an opposite direction, the belt 21 is wound on the pulley, and the hook elements 19 are shortened.

The power transmitting mechanism 25, which functions to transmit a driving force of the moving motor 26 to the gear wheels 23 thereby moves the baseplate 24, and is constructed as described below. The horizontal driven shaft 25*b* is positioned on an upper surface of the baseplate 24 to extend in a widthwise direction of the baseplate 24. Both ends of the horizontal driven shaft 25*b* are supported by bearings. The gear wheels 23 are secured to both ends of the horizontal driven shaft 25*b*, and a first bevel gear 25*a* is secured to a middle portion of the horizontal driven shaft 25*b*.

A vertical power-transmitting shaft 25*f* is installed in one of the support cylinders 22 which are secured to the baseplate 24, while being rotatably supported by at least one bearing. A second bevel gear 25*c* is secured to an upper end of the vertical power-transmitting shaft 25*f*, and a worm wheel 25*e* is secured to a lower end of the vertical power-transmitting shaft 25*f*. The second bevel gear 25*c* is meshed with the first bevel gear 25*a*. The worm wheel 25*e* is meshed with a worm 25*d* which is secured to a shaft of the moving motor 26 which is supported by the lifter case 18. Accordingly, as the moving motor 26 is driven, rotational power is transmitted through the worm 25*d* and worm wheel 25*e* which are meshed with each other. The vertical power-transmitting shaft 25*f* is thereby rotated, and power is transmitted through the first and second bevel gears 25*a* and 25*c* which are meshed with each other. The horizontal driven shaft 25*b* is thereby rotated, and finally, the gear wheels 23 can roll on the toothed rail parts 15.

Figure 4:
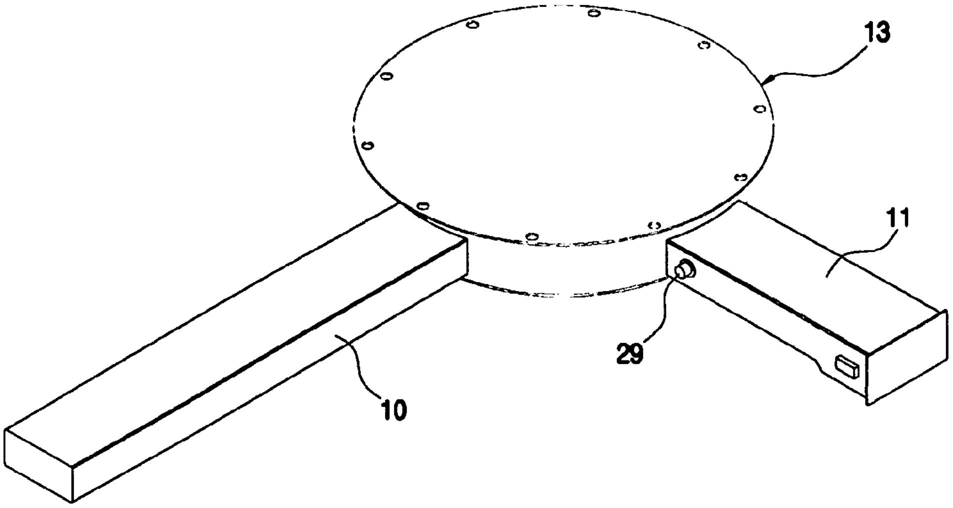
FIG. 4 is a perspective view illustrating a structure of a rail member in the lift apparatus for a vehicle for the handicapped according to the present invention.
Figure 5:
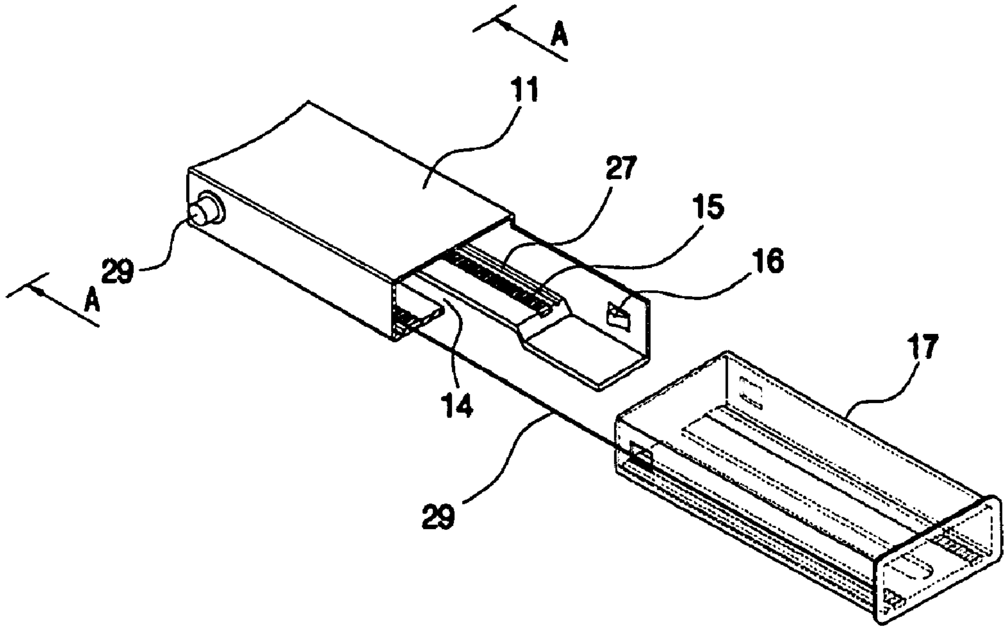
FIG. 5 is an exploded perspective view of FIG. 4.

FIG. 4 is a perspective view illustrating a structure of the rail member in the lift apparatus for a vehicle for the handicapped according to the present invention; and FIG. 5 is an exploded perspective view of the rail member of FIG. 4. Each of the rail members 10 and 11 functions to guide the movement of the lifter 12 including the seat. Each of the rail members 10 and 11 has an elongate box-shaped configuration. An opening 14 is defined through a widthwise center portion of the bottom wall of each rail member 10 and 11 to extend in a lengthwise direction of each rail member 10 and 11, so that the support cylinders 22 of the lifter 12 can be moved through the opening 14. The pair of toothed rail parts 15 are formed on the bottom wall of each rail member 10 and 111 at both sides of the opening 14, so that the gear wheels 23 of the lifter 12 can roll on the toothed rail parts 15.

In particular, in the case of the leftward and rightward moving rail member 11, in order to completely guide the seat to the outside, the leftward and rightward moving rail member 11 must have a sufficient length. In this regard, since a width of the roof panel for mounting the rail member 11 is not sufficient, it is preferred to adopt an extending and retracting type double rail structure. To this end, an auxiliary leftward and rightward moving rail member 17 having substantially the same length as the leftward and rightward moving rail member 11 is installed in the leftward and rightward moving rail member 11. Thus, with the auxiliary leftward and rightward moving rail member 17 maximally extended out of the leftward and rightward moving rail member 11, a sideward moving distance of the leftward and rightward moving rail member 11 can be doubled.

In order to prevent the auxiliary leftward and rightward moving rail member 17 from being completely released from the leftward and rightward moving rail member 11, adjacent to a distal end of the leftward and rightward moving rail member 11, a pair of stoppers 16 are installed on side walls of the rail member 111 in a manner such that the stoppers 16 are biased by a pair of springs, respectively, toward the inside of the rail member 11. Accordingly, when the auxiliary leftward and rightward moving rail member 17 is almost fully extended out of the leftward and rightward moving rail member 11, the stoppers 16 are inserted by a spring force into holes which are defined through side walls of the auxiliary leftward and rightward moving rail member 17, whereby the auxiliary leftward and rightward moving rail member 17 are prevented from further extending out of the leftward and rightward moving rail member 11. When the auxiliary rail member 17 is retracted into the rail member 11, since the stopper 16 has an inclined surface, the auxiliary rail member 17 can be moved smoothly on the inclined surface while pressing inward the stopper 16.

Adjacent to the distal end of the leftward and rightward moving rail member 11, a stepped portion is formed on the bottom wall of the rail member 11. Due to the presence of the stepped portion, immediately before the auxiliary rail member 17 reaches a possible full extending position, the auxiliary rail member 17 can be slightly moved downward so that an upper surface of the bottom wall of the auxiliary rail member 17 is flush with an upper surface of the bottom wall of the rail member 11. Consequently, when the lifter 12 is moved into and out of the vehicle, the lifter 12 can pass smoothly a boundary region between the rail member 111 and the auxiliary rail member 17.

As a rear end of the auxiliary rail member 17 is pushed by the baseplate 24 when the lifter 12 is moved, the auxiliary rail member 17 can be extended out of the rail member 11. Also, as the auxiliary rail member 17 is pulled by a wire 39 which is wound on a re-coiler 29, the auxiliary rail member 17 can be retracted into the rail member 11.

Figure 9:
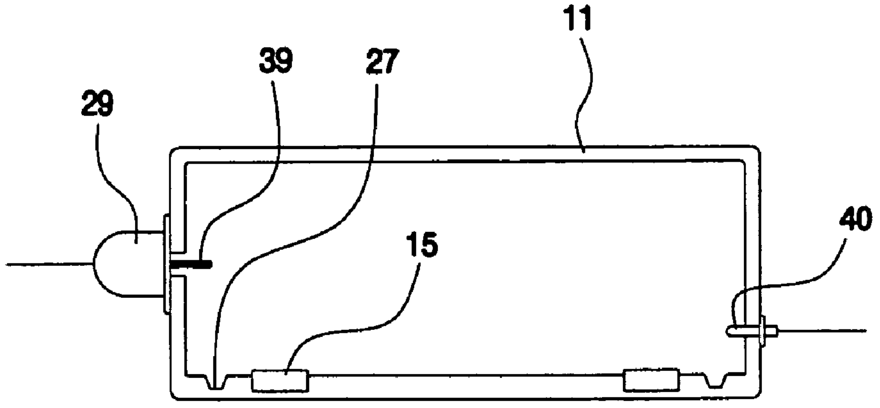
FIG. 9 is a cross-sectional view taken along the line A-A of FIG. 5.

That is to say, the re-coiler 29 is installed on one of the side walls of the leftward and rightward moving rail member 11 in a state in which the wire 39 (FIG. 9) is wound on the re-coiler 29 using a coil spring. A distal end of the wire 39 which extends from the re-coiler 29 is connected to a distal end of the auxiliary leftward and rightward moving rail member 17. A switch 40 is installed on the other of the side walls of the leftward and rightward moving rail member 11 in opposition to the re-coiler 29.

As described above, since the coil spring is installed in the re-coiler 29, when the wire 39 is unwound from the re-coiler 29, the coil spring is wound to accumulate a force. Then, as the baseplate 24 presses the switch 40 through a trigger 41 which is formed on one widthwise end of the baseplate 24, while the baseplate 24 is returned to its original position, the switch 40 generates a signal to operate the re-coiler 29. Thus, as the wire 39 is wound again on the re-coiler 29 by the force of the coil spring, the auxiliary leftward and rightward moving rail member 17 can be retracted into the leftward and rightward moving rail member 11.

Of course, while the trigger 41 of the baseplate 24 also presses the switch 40 when the auxiliary rail member 17 is extended out of the rail member 11, at this time, since the coil spring of the re-coiler 29 does not receive any force, the coil spring does not apply any force to the auxiliary rail member 17. That is to say, the re-coiler 29 functions in the same manner when winding and unwinding an electric line in a domestic cleaner.

Figure 6:
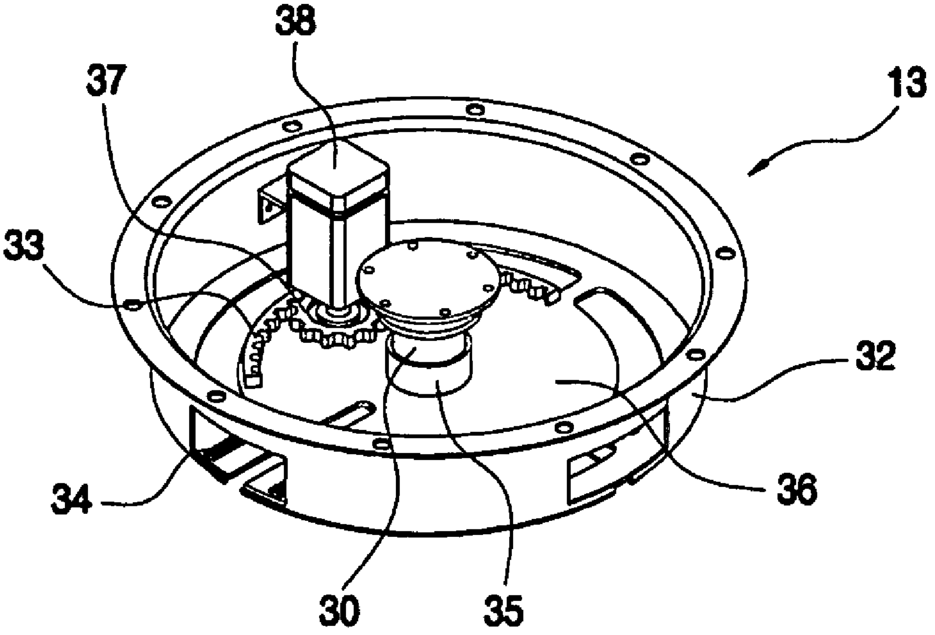
FIG. 6 is a perspective view illustrating a structure of a rotating device in the lift apparatus for a vehicle for the handicapped according to the present invention.
Figure 7:
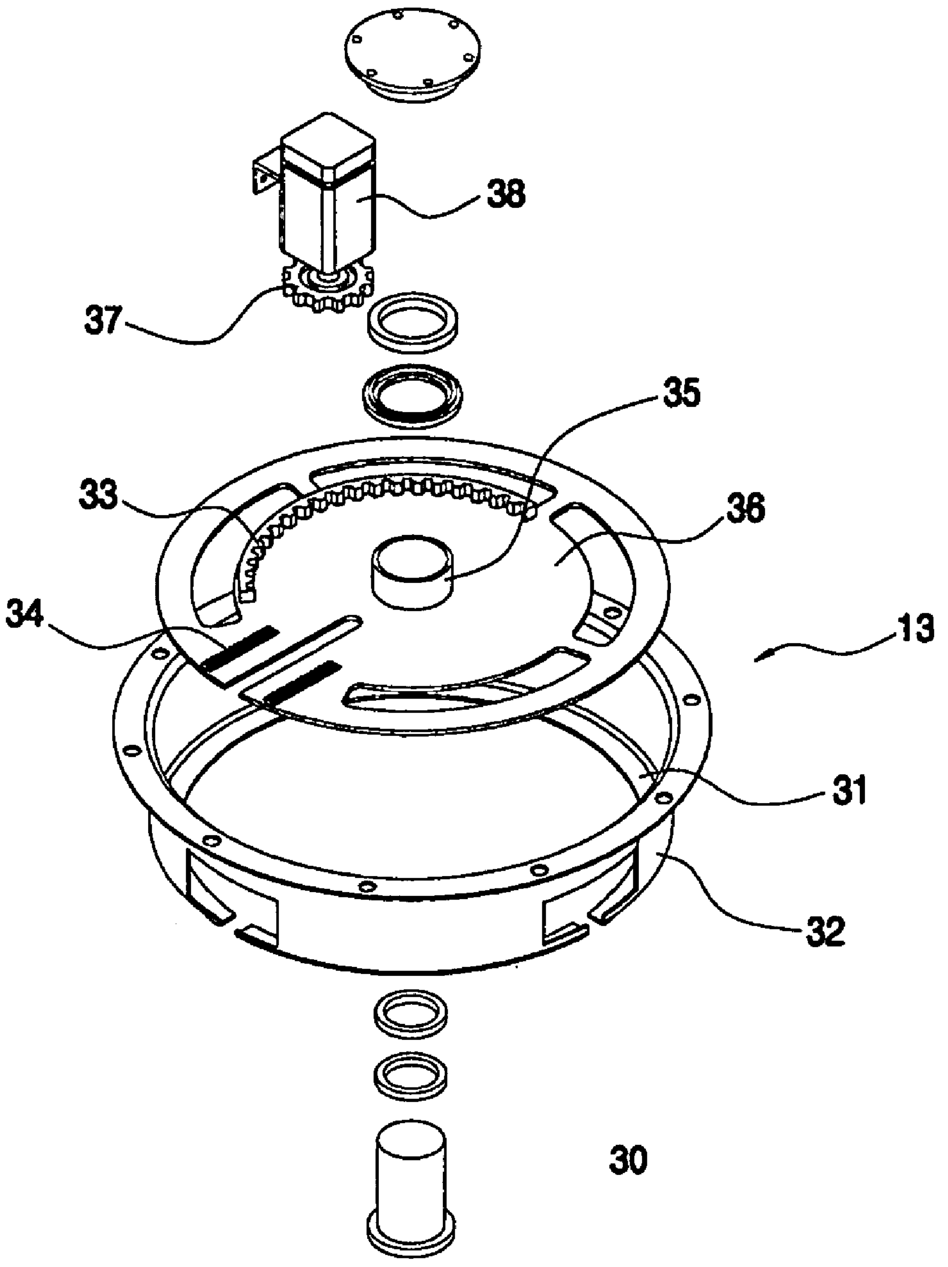
FIG. 7 is an exploded perspective view of FIG. 6.

FIG. 6 is a perspective view illustrating a structure of the rotating device 13 in the lift apparatus for a vehicle for the handicapped according to the present invention; and FIG. 7 is an exploded perspective view of FIG. 6. The rotating device 13 is installed at the intersection of the forward and rearward moving rail member 10 and the leftward and rightward moving rail member 11. The rotating device 13 functions to rotate by 90° the lifter 12 positioned at the intersection.

In the rotating device 13, a rotating device case 32 having a substantially cylindrical configuration is mounted to the roof panel of the vehicle body. A rotating plate 36 which is actually rotated is received in the rotating device case 32. The entire lifter 12 can be rotated in a state in which it is placed on the rotating plate 36. To this end, a support shaft 30 is located at a center portion of the rotating device case 32 in a manner such that the support shaft 30 is supported by the roof panel. The rotating device case 32 is formed at a lower end thereof with an inward flange 31. The moving rail members 10 and 11 are integrally assembled to the rotating device case 32 through cut-away portions which are formed in a side wall of the rotating device case 32. The moving rail members 10 and 11 assembled in this way are communicated with the inside of the rotating device case 32.

The rotating plate 36 is formed at a center portion thereof with a tubular projection 35 which extends upward. As the tubular projection 35 is fitted around the support shaft 30 via at least one bearing, the rotating plate 36 is rotatably supported in the rotating device case 32. At a position which is separated by a predetermined distance from the tubular projection 35, an arc-shaped rack gear 33 which is concentric to the tubular projection 35 is installed on the rotating plate 36 to receive power.

Also, a rotating motor 38 is secured to the rotating device case 32 to be supported in the vertical direction by the rotating device case 32. A pinion gear 37 which is mounted to a shaft of the rotating motor 38 is meshed with the arc-shaped rack gear 33 which is mounted to the rotating plate 36. Therefore, as the rotating motor 38 is driven, the rotating plate 36 can be rotated. The rotating plate 36 can be rotated within a range of about 90°. The rotation range of the rotating plate 36 can be controlled by regulating the revolutions or rpm of the rotating motor 38, or through a separate stopper, limit switch, or the like.

The rotating plate 36 has a pair of parallel rack gears 34 which ensure the introduction of the baseplate 24 and the gear wheels 23 into the rotating device case 32. Between the pair of parallel rack gears 34, an opening is defined through the rotating plate 36 so that the entire lifter 12 can be temporarily accommodated in the rotating device 13. By this fact, if the baseplate 24 and the gear wheels 23 of the lifter 12 rest on the rotating plate 36, through driving of the rotating motor 38 and power transmission between the pinion gear 37 and the arc-shaped rack gear 33, the entire rotating plate 36 is rotated through 90°, whereby the lifter 12 which is moved from the forward and rearward moving rail member 10 can change direction. Here, it is preferred that at least one bearing be interposed between the rotating plate 36 and the inward flange 31 of the rotating device case 32 so that the rotation of the rotating plate 36 can be guided and the rotation plate 36 can be stably supported on the inward flange 31 while being rotated.

Figure 8:
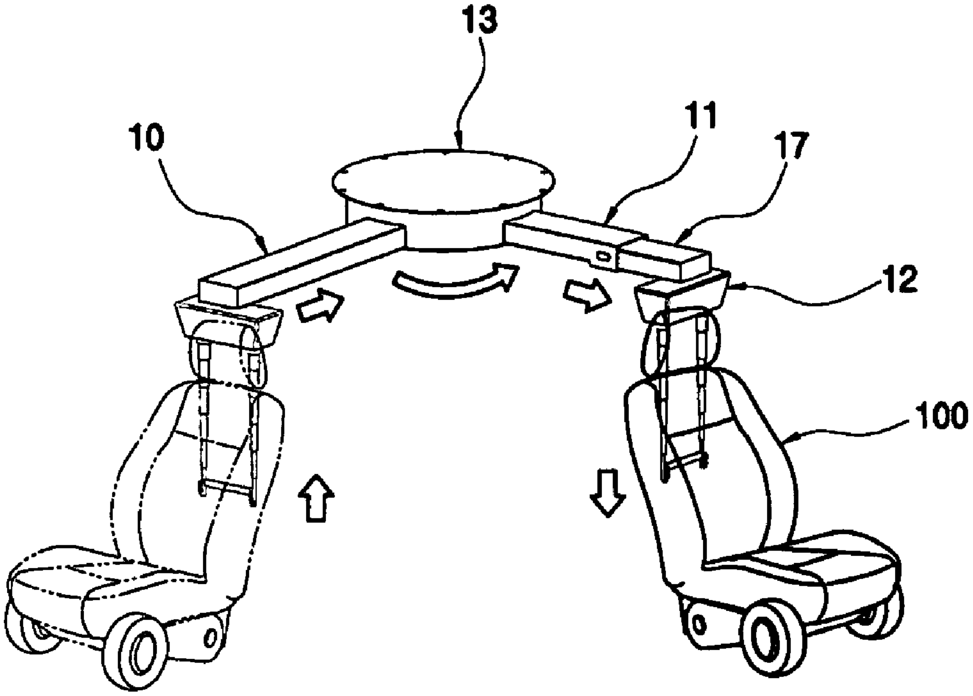
FIG. 8 is a schematic view illustrating an in-use state of the lift apparatus for a vehicle for the handicapped according to the present invention.

FIG. 8 is a schematic view illustrating an in-use state of the lift apparatus for a vehicle for the handicapped according to the present invention. A procedure in which the seat 100 is lowered down out of the vehicle using the lift apparatus according to the present invention will be described below.

(1) The seat 100 is coupled to the lifter 12 and moved rearward along the forward and rearward moving rail member 10.

(2) As the seat 100 reaches a desired position, that is, the inside of the rotating device 13, the seat 100 is rotated by a driving force of the rotating motor 38.

(3) After rotation of the seat 100, the lifer 12 is moved along the leftward and rightward moving rail member 11.

(4) In succession, the lifer 12 is moved while pushing the auxiliary leftward and rightward moving rail member 17. From the time the auxiliary leftward and rightward moving rail member 17 is completely extended out of the leftward and rightward moving rail member 11, the lifter 12 is moved along the auxiliary leftward and rightward moving rail member 17, and the seat 100 is also moved to the outside.

(5) After the lifter 12 is completely moved along the auxiliary leftward and rightward moving rail member 17, the lifer 12 is operated to lower the seat 100 to the ground.

(6) When the seat comes into contact with the ground, a fastening device is released.

(7) After the lifer 12 is raised, the lifter 12 is moved sideward toward the rotating device 13, and the auxiliary leftward and rightward moving rail member 17 is retracted into the leftward and rightward moving rail member 11.

(8) A procedure in which the seat 100 is taken up into the vehicle is implemented in reverse order.

As apparent from the above descriptions, the lift apparatus for a vehicle for the handicapped according to the present invention provides advantages as described below.

(1) Since rail members and a rotating device are mounted to a roof panel of a vehicle body to maximize available space below an H-point, interference can be avoided when rotating a seat.

(2) Due to the fact that a double rail structure for moving the seat to the outside of the vehicle is adopted, it is possible to simplify an entire structure including rail members.

(3) Because only a rotation force of a motor is used as means for lifting and lowering the seat, it is possible to accomplish a structure which is simple and light in weight as compared to conventional link structures.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A lift apparatus for a vehicle for the handicapped, comprising:

a forward and rearward moving rail member mounted to a roof panel within a vehicle body, where the forward and reversed moving rail member is configured to extend rearward from a position of a driver's seat by a predetermined distance;

a leftward and rightward moving rail member mounted to the roof panel and configured to extend sideward from a rear end of the forward and rearward moving rail member by a preselected distance;

a lifter movable along the forward and rearward moving rail member and the leftward and rightward moving rail member and capable of lifting and holding the seat and lowering and releasing the seat; and a rotating device installed at an intersection of the forward and rearward moving rail member and the leftward and rightward moving rail member, for rotating the lifter by a predetermined angle;

wherein the lifter comprises:

a lifter case;

a pair of hook elements coupled to a bottom wall of the lifter case to extend downward in a vertical direction, for suspending the seat;

a lifting and lowering motor for lifting and lowering the hook elements;

a belt connected between the hook elements and the lifting and lowering motor and capable of being wound;

a baseplate capable of being moved in each rail member;

a pair of support cylinders each having one end secured to the baseplate and the other end secured to the lifter case to support the lifter case against the baseplate, and extending through the opening defined in the bottom wall of each rail member;

a pair of gear wheels rotatably secured to the baseplate and engaged with the toothed rail parts of each rail member to allow the baseplate to be moved in each rail member; and a moving motor for driving the gear wheels, the moving motor including a power transmitting mechanism.

2. The lift apparatus as set forth in claim 1, wherein each of the forward and rearward moving rail member and the leftward and rightward moving rail member has an elongate box-shaped configuration in which an opening is defined through a bottom wall of the elongate box to extend in a lengthwise direction of the elongate box and a pair of toothed rail parts are formed on the bottom wall at both sides of the opening.

3. The lift apparatus as set forth in claim 2, wherein the leftward and rightward moving rail member further comprises an auxiliary leftward and rightward moving rail member for retracting into and extending out of the leftward and rightward moving rail member, the extending out movement being limited by a stopper.

4. The lift apparatus as set forth in claim 3, wherein the auxiliary leftward and rightward moving rail member is connected with a wire which is wound on a re-coiler mounted to the leftward and rightward moving rail member, and the re-coiler is operated by a switch which is installed on the leftward and rightward moving rail member and generates a signal as the baseplate is brought into contact with the switch, to retract the auxiliary leftward and rightward moving rail member into the leftward and rightward moving rail member.

5. The lift apparatus as set forth in claim 1, wherein the leftward and rightward moving rail member includes an auxiliary leftward and rightward moving rail member which can be retracted into and extended out of the leftward and rightward moving rail member while its outward movement is limited by a stopper.

6. The lift apparatus as set forth in claim 5, wherein the auxiliary leftward and rightward moving rail member is connected with a wire which is wound on a re-coiler mounted to the leftward and rightward moving rail member, and the re-coiler is operated by a switch which is installed on the leftward and rightward moving rail member and generates a signal as the baseplate is brought into contact with the switch, to retract the auxiliary leftward and rightward moving rail member into the leftward and rightward moving rail member.

7. The lift apparatus as set forth in claim 1, wherein each of the hook elements has a telescopic shape capable of adjusting its length.

8. The lift apparatus as set forth in claim 1, wherein the power transmitting mechanism comprises:

a horizontal driven shaft rotatably supported by bearings on the baseplate, with a first bevel gear secured to a middle portion of the horizontal driven shaft and the pair of gear wheels respectively secured to both ends of the horizontal driven shaft; and a vertical power-transmitting shaft extending through one of the pair of support cylinders while being rotatably supported by at least one bearing, and having at an upper end thereof a second bevel gear which is meshed with the first bevel gear and at a lower end thereof a worm wheel which is meshed with a worm mounted to an output shaft of the moving motor.

9. The lift apparatus as set forth in claim 1, wherein each rail member has a pair of sliding grooves which are defined on the bottom wall of the rail member at both sides of the opening to extend ma lengthwise direction of the rail member; and the baseplate has at both widthwise ends thereof sliding projections which extend in a lengthwise direction of the baseplate and are engaged into the sliding grooves of each rail member.

10. The lift apparatus as set forth in claim 1, wherein the rotating device comprises:

a support shaft located at a center portion;

a rotating device case mounted to the roof panel and formed at a lower end thereof with an inward flange;

a rotating plate received in the rotating device case, placed on the inward flange of the rotating device case, and formed at a center portion thereof with a tubular projection which is fitted around the support shaft via at least one bearing to be rotatably supported in the rotating device case, the rotating plate having an arc-shaped rack gear for transmitting power and a pair of parallel rack gears with which the gear wheels of the lifter are meshed; and a rotating motor secured to the rotating device case and having a pinion gear which is meshed with the arc-shaped rack gear to rotate the rotating plate.

* * * * *